(12) United States Patent
Lablans

(10) Patent No.: US 7,864,087 B2
(45) Date of Patent: Jan. 4, 2011

(54) METHODS AND SYSTEMS FOR MODIFYING THE STATISTICAL DISTRIBUTION OF SYMBOLS IN A CODED MESSAGE

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 0 days.

(21) Appl. No.: 12/642,916

(22) Filed: Dec. 21, 2009

(65) Prior Publication Data

US 2010/0109922 A1 May 6, 2010

Related U.S. Application Data

(63) Continuation of application No. 12/188,261, filed on Aug. 8, 2008, now Pat. No. 7,659,839.

(60) Provisional application No. 60/956,024, filed on Aug. 15, 2007.

(51) Int. Cl.
*H03M 7/00* (2006.01)

(52) U.S. Cl. .......................... 341/107; 341/51; 341/52; 341/67; 341/102; 341/103

(58) Field of Classification Search .................. 341/50, 341/51, 52, 67, 102, 103, 106, 107
See application file for complete search history.

(56) References Cited

U.S. PATENT DOCUMENTS

| | | | |
|---|---|---|---|
| 5,070,504 A * | 12/1991 | Bossen et al. ............... 714/808 |
| 5,818,369 A * | 10/1998 | Withers ....................... 341/107 |
| 5,829,466 A | 11/1998 | Church | |
| 5,892,466 A * | 4/1999 | Walker ......................... 341/57 |
| 6,075,471 A * | 6/2000 | Kimura et al. ............... 341/107 |
| 6,222,468 B1 * | 4/2001 | Allen .......................... 341/107 |
| 6,298,160 B1 * | 10/2001 | Goertzen ..................... 382/232 |
| 6,411,231 B1 * | 6/2002 | Yanagiya et al. ............ 341/107 |
| 6,501,801 B2 | 12/2002 | Chujoh et al. | |
| 6,677,868 B2 * | 1/2004 | Kerofsky et al. ............ 341/107 |
| 6,794,999 B1 | 9/2004 | Said | |
| 6,850,175 B1 * | 2/2005 | Bossen ........................ 341/107 |
| 6,967,601 B2 | 11/2005 | Bossen | |
| 7,508,399 B2 | 3/2009 | Kim et al. | |
| 7,573,405 B2 * | 8/2009 | Shima ......................... 341/51 |
| 7,586,924 B2 | 9/2009 | Wiegand | |
| 7,605,722 B2 | 10/2009 | Beack et al. | |
| 2003/0125055 A1 | 7/2003 | Kim et al. | |
| 2008/0031251 A1 | 2/2008 | Rajan et al. | |

* cited by examiner

*Primary Examiner*—Linh V Nguyen
(74) *Attorney, Agent, or Firm*—Diehl Servilla LLC

(57) ABSTRACT

A method for coding a message of a plurality of m-state symbols into a coded message of n-state symbols wherein n>m is disclosed. A method to make the distribution of states of n-state symbols a uniform distribution is also disclosed. A coding rule is initiated based on a distribution of states of m-state symbols. A method of coding the coding rule by transposition is also provided. In one embodiment a coded message of n-state symbols has symbols that each have a unique state. A system for executing the coding and decoding methods is also disclosed.

20 Claims, 7 Drawing Sheets

US 7,864,087 B2

METHODS AND SYSTEMS FOR MODIFYING THE STATISTICAL DISTRIBUTION OF SYMBOLS IN A CODED MESSAGE

STATEMENT OF RELATED CASES

This application is a continuation and claims the benefit of U.S. patent application Ser. No. 12/188,261, filed on Aug. 8, 2008, which claims the benefit of U.S. Provisional Patent Application Ser. No. 60/956,024 filed on Aug. 15, 2007 which are both incorporated herein by reference in their entirety.

BACKGROUND OF THE INVENTION

The present invention relates to coding of a sequence of symbols into a different sequence of symbols in a manner that modifies the statistical properties of the original sequence. More specifically it relates to coding a message of m-valued symbols into a message of n-valued symbols with n>m.

For illustrative purposes messages using symbols that may represent text are used herein. It is to be understood that any message, including but not limited to a text message, a data message, an audio message, a video message or any message that applies symbols may apply the coding and/or decoding methods and systems disclosed herein as an aspect of the present invention.

It is known that text messages based on letters or other symbols comprise important statistical information related to the applied language. For instance frequency analysis of letters in an English text message of sufficient length will show that the letters 'e' and 't' occur the most often. Such analysis can also be applied to combinations of 2 letters (digrams), such as 'th' and 'ea' or combinations of even more letters. Such a frequency analysis will provide important information about an encrypted message and may form the basis for cryptanalysis.

Known statistical technologies can provide a cryptanalyst important hooks to start deciphering an enciphered message. Current encryption methods may apply keys. A key may be a known series of symbols against which a message may be coded or decoded. Cryptanalysis of the ciphers is known to be difficult and very resource intensive. However ultimately statistical assumptions, combined with brute force calculations have proven to help break many codes. Clearly it would be helpful the security of a message if one could modify the statistical distribution of symbols of a message, whereby the modification will not affect the content or cleartext of a message and the coding and decoding can be performed automatically with a computer program.

Performance of transmission systems, may improve if the energy in a message is distributed equally and uniformly over time and over individual channels.

Accordingly novel and improved methods and systems are required that can modify statistical information of a message to resist cryptanalysis or to obtain better transmission performance.

SUMMARY OF THE INVENTION

One aspect of the present invention presents a novel method and system of coding a message comprised of m-valued into a message of n-valued symbols that will provide the coded message with a substantially pre-determined distribution of symbols.

In accordance with another aspect of the present invention a method is provided for coding in accordance with a coding rule a message having a plurality of symbols able to assume one of m states and wherein at least one symbol in a first of m states occurs at least two times in the message into a plurality of n-valued symbols with n>m, comprising reversibly coding a first occurrence of the one symbol in a first of m states into a symbol in a first of n states; and reversibly coding a second occurrence of the one symbol in a first of m states into a symbol in a second of n states.

In accordance with a further aspect of the present invention a coding method is provided wherein the plurality of symbols able to assume one of m states have their states distributed over m states in accordance with a first statistical distribution and the plurality of n-valued symbols have their states distributed over n states in accordance with a second statistical distribution.

In accordance with another aspect of the present invention a coding method is provided wherein the second statistical distribution is substantially a uniform distribution.

In accordance with a further aspect of the present invention a coding method is provided further comprising enciphering the coded message with a different coding rule.

In accordance with a further aspect of the present invention a method is provided for coding a message of p m-state symbols with p>2, each m-state symbols able to assume one of m states with m≧2, comprising determining a distribution of m-state symbols in the message, selecting, based on the distribution of m-state symbols, of a coding rule that codes each m-state symbol in the message into an n-state symbol with n>m, and coding with the coding rule each m-state symbol in the message into an n-state symbol in a coded message.

In accordance with yet a further aspect of the present invention a method is provided for coding, wherein the distribution of m-state symbols in the message is substantially different from the distribution of n-state symbols in the coded message.

In accordance with yet a further aspect of the present invention a method is provided for coding, wherein the distribution of n-state symbols in the coded message is substantially uniform.

In accordance with yet a further aspect of the present invention a method is provided for coding, wherein each n-state symbol in the coded message has a unique state.

In accordance with yet a further aspect of the present invention a method is provided for coding, wherein a first and a second m-state symbol each having a first of m states in the message are coded into a first and a second n-state symbol having a first and a second of n states respectively.

In accordance with yet a further aspect of the present invention a method is provided for coding, wherein a single n-state symbol is represented as a plurality of k-state symbols with k<n.

In accordance with yet a further aspect of the present invention a method is provided for coding, wherein the message is scrambled before being coded.

In accordance with yet a further aspect of the present invention a method is provided for coding, further comprising a corresponding decoding method.

In accordance with yet a further aspect of the present invention a method is provided for coding, further comprising generating a pseudo-random sequence of at least p different symbols, and determining a unique state of an n-state symbol based on the pseudo-random sequence.

In accordance with yet a further aspect of the present invention a method is provided for coding, wherein the message is an audio message.

In accordance with a further aspect of the present invention a system is provided for coding a message of p m-state symbols with p>2, each m-state symbols able to assume one of m states with m≧2, comprising a memory device, a processor, enabled to execute instructions to perform the steps of determining a distribution of m-state symbols in the message, selecting, based on the distribution of m-state symbols, of a coding rule that codes each m-state symbol in the message into an n-state symbol with n>m, and coding with the coding rule each m-state symbol in the message into an n-state symbol in a coded message.

In accordance with yet a further aspect of the present invention a system is provided for coding, wherein the distribution of m-state symbols in the message is substantially different from the distribution of n-state symbols in the coded message.

In accordance with yet a further aspect of the present invention a system is provided for coding, wherein the distribution of n-state symbols in the coded message is substantially uniform.

In accordance with yet a further aspect of the present invention a system is provided for coding, wherein each n-state symbol in the coded message has a unique state.

In accordance with yet a further aspect of the present invention a system is provided for coding, wherein a first and a second m-state symbol each having a first of m states in the message are coded into a first and a second n-state symbol having a first and a second of n states respectively.

In accordance with yet a further aspect of the present invention a system is provided for coding, wherein a single n-state symbol is represented as a plurality of k-state symbols with k<n.

In accordance with yet a further aspect of the present invention a system is provided for coding, wherein the message is scrambled before being coded.

In accordance with yet a further aspect of the present invention a system is provided for coding, further enabled to perform the steps of generating a pseudo-random sequence of at least p different symbols, and determining a unique state of an n-state symbol based on the pseudo-random sequence.

In accordance with yet a further aspect of the present invention a system is provided for coding, wherein the system is part of a communication system.

In accordance with yet a further aspect of the present invention a system is provided for coding, further comprising a corresponding decoding system enabled to execute instructions to perform the step of: decoding each n-state symbol in the coded message into a message of p m-state symbols.

DESCRIPTION OF A PREFERRED EMBODIMENT

Figure 1:
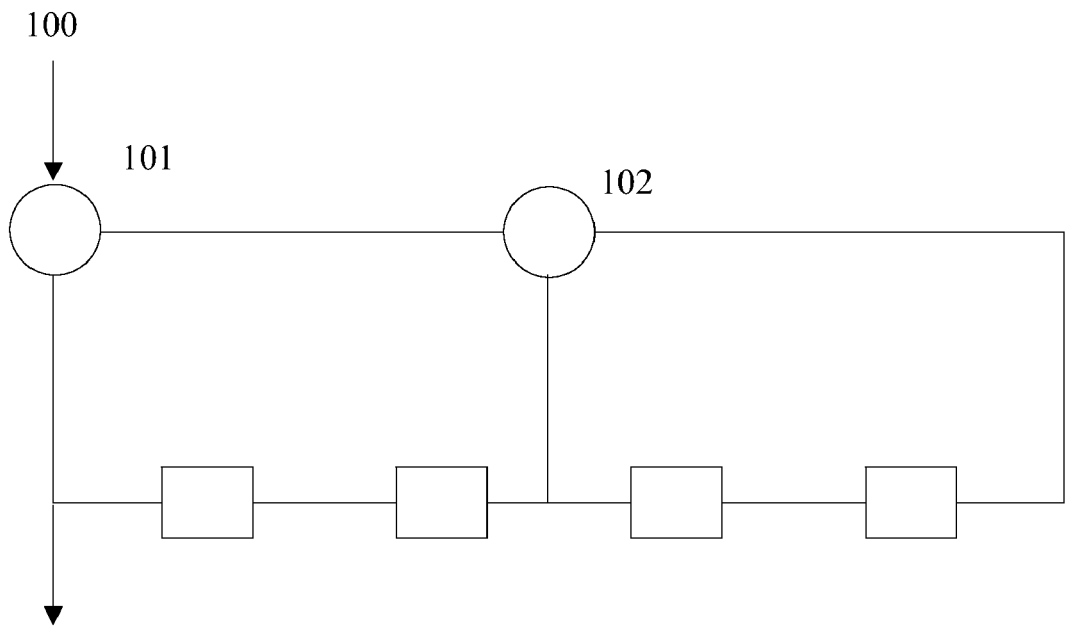
FIG. 1 is a diagram of an LFSR coder.

It was shown by the inventor in U.S. Pat. No. 7,064,684 issued on Jun. 20, 2006 and U.S. patent application Ser. No. 11/407,496 filed on Apr. 6, 2006 which are incorporated herein by reference in their entirety, how one can code a sequence of m-valued symbols in a sequence of an equal number of n-valued symbols with n>m. This 'higher value' coding can be applied to better distinguish between two m-valued sequences that look very much alike but have several distinctive differences.

One may take as a simple example a coding rule that codes binary symbols into 5-valued symbols. A coding rule may be expressed as [0 0 0 0 1]→[0 2 3 4 1]. This rule dictates that a first 0 is coded into a 0; a second zero (occurring after the first one) is coded into a 2; a third 0 (occurring after the second one) is coded into a 3; and a fourth 0 (occurring after the third one) is coded into a 4. If a fifth 0 occurs it is treated as being a first 0. A 1 is always coded into a 1. A sequence [0 0 0 0 0 1 0 0] and a sequence [0 1 0 0 0 0 0 0] will then be coded into: [0 2 3 4 0 1 2 3] and [0 1 2 3 4 0 2 3]. In binary form the two sequences have 6 symbols in common in like positions, and in 5-valued form just 3.

The distribution of symbols in the 5-valued sequences is more uniform than the distribution of 0s and 1s in the first two sequences. One may select a 'higher-value' coding rule that flattens or makes more uniform the distribution of symbols in the higher valued sequence. Overall one may determine the distribution of symbols and create a code rule that would generate a coded message that has a uniform distribution of symbols.

However a longer message of higher coded binary symbols may continue to display certain message properties. For instance certain combinations of higher value symbols may re-occur in a message. This means that higher coded sequences will display a pattern of clusters of for instance [0 2] or [2 3] or [3 4], giving away important statistical information. In those cases a higher-valued coded message is still open to cryptanalysis by frequency count of multiple symbol combinations such as digrams or trigrams.

In order to break up combinations of symbols one should use additional enciphering methods. Those methods should be as random as possible. Many different methods exist. To stay within the field of n-valued logic a first embodiment of further enciphering can be performed by using an n-valued LFSR scrambler. In a second embodiment the additional enciphering can be done by reversible transposition methods. Both forms of encipherment are disclosed by the inventor in U.S. patent application Ser. No. 11/534,777 filed Sep. 25, 2006 and U.S. patent application Ser. No. 10/935,960 filed Sep. 8, 2004 which are both incorporated herein by reference in their entirety.

The history of cryptanalysis demonstrates that important information may be gathered regarding coding schemes from relatively simple assumptions. For instance receiving a message with uniform distribution of symbols one may assume that the underlying plaintext message is in compliance with the known symbol distribution of the language of the message. Another fairly simple assumption may be that consecutive values representing symbols are by some measure repeats of the plaintext symbols in accordance with a coding rule.

Smart coding would identify some of the simplest assumptions and provide measures to not apply those assumptions in coding.

For instance one can pre-distort a message by inserting meaningless symbols that will be recognized as such immediately. Also one can make an assignment scrambler that scrambles the code symbols for instance by transposition before they are assigned to the symbols that they code for. These assignments would be very time consuming manually, but can be performed rapidly by a computer.

A first step in further coding of a message is to determine a current distribution of symbols by counting all symbols. For instance one may use as an example the message: "meemm mamem emame memee". This message applies 20 symbols of the alphabet {a, e, m} having 3 symbols. The message is shown as groups of 5 symbols. The space between the groups has no meaning in the message text. The symbol "a" occurs 2 times; the symbol "e" occurs 8 times; and the symbol "m" occurs 10 times. One can 'flatten' the distribution of symbols by multi-valued coding of the symbols occurring the most: "m" and "e". One way to adjust the distribution is to make sure that each symbol in a message occurs as many times as any other symbol. Accordingly one should code the single symbol "m" which occurs 10 times, into 5 symbols, each occurring 2 times. The symbol "e", which occurs 8 times, should be coded into 4 symbols of which 4 occur 2 times. A coding scheme may be provided as [m m m m m e e e e]→[m1 m2 m3 m4 m5 e1 e2 e3 e4]. This means that the first occurrence of symbol "m" starting from a starting point will be coded as a symbol "m1", the second symbol "m" occurring after the first one into "m2" up until the $5^{th}$ occurrence which is coded into "m5". Implied in this is that the sixth occurrence of "m" will again be coded into "m1". The same rule applies to the symbol "e".

Independent Symbol Coding

One may apply multi-valued coding rules in several ways or variations. The first variation is independent coding. In that case each symbol is assigned its own coding rule, independent from other symbols. This means that coding a message comprises a set of coding rules of which at least one rule applies to a single symbol. Accordingly one could provide the coding rule provided above as:

[a]→[a]

[m m m m m]→[m1 m2 m3 m4 m5]

[e e e e]→[e1 e2 e3 e4]

Each coding rule for a symbol will be executed independently of any other coding rule. The above message will then be coded as: "meemm mamem emame memee"→"m1e1e2m2m3 m4a1m5e3m1 e4m2a2m3e1 m4e2m5e3e4". Herein 'a' is coded as [a a]→[a1 a2]. It should be clear that symbol names like e1 and m1 are provided to explain the coding rule and that such a giveaway should not be used in actual coding. One may then provide the independent coding rule:

[a]→[a k]

[m m m m m]→[b c d e f]

[e e e e]→[g h i j]

This will code "meemm mamem emame memee" →"bghcd eafib jckdg ehfij". This method of multi-valued coding is completely reversible. Unfortunately the coding rule has a give away, as it codes consecutive m-valued symbols into consecutive higher valued symbols. Accordingly one should code the coding rule, preferably in such a way that recovering the coding rule would be difficult without knowing the initial state of the coder that codes the coder rule.

One way of coding a coding rule is use an n-valued scrambler, enabled to scramble 10-valued symbols. Because one may require a one-to-one symbol scrambler a preferred scrambler may be a transposition scrambler, which changes the position of a symbol in a sequence. For instance a coding rule [m m m m m e e e e a a]→[m1 m2 m3 m4 m5 e1 e2 e3 e4 a1 a2] may be coded to: [m m m m m e e e e a a]→[e4 a2 m4 m1 e1 a1 m2 e3 m3 e2 m5]. Accordingly the coding rule of the above example becomes:

[m1 m2 m3 m4 m5 e1 e2 e3 e4 a1 a2]→[e4=j a2=k m4=e m1=b e1=g e1=a m2=c e3=i m3=d e2=h m5=f]. The message will then be coded as: "meemm mamem emame memee"→"jacke bhgij dkfea bcgid". It should be clear that the coding up to now is merely for changing the statistical make-up of the message. It should preferably not be used as a main coding scheme. In the present coded message a symbol corresponding to a coded symbol in one position is identical to a symbol corresponding to an identical symbol in a different position. In longer messages one can diminish that effect by using more symbols. However unless one provides every symbol with a unique code symbols will be repeated.

Dependent Coding

One may also execute the coding rules in a dependent way. That is: after one symbol has exhausted its coding rule, all coding rules are reset to start from position 1. For instance in the example "meemm mamem emame memee" the coding rule for coding the symbol "m" has reached its $5^{th}$ symbol in the second m in "mamem". However, the symbol "e" following this "m" is the third "e" and the coding rule for "e" was not yet exhausted. Under a dependent coding rule, for instance after reaching the $5^{th}$ "m" it is also assumed that the $4^{th}$ "e" was coded and that both the "m" and the "e" coding rule start at position 1. One may restart the coding rules when any of the individual coding rules is meeting a certain criterion. For instance all or some of the coding rules may be reset after one coding rule has been completed once or p times if one so wishes.

One may also restart any or all coding rules when a certain number of symbols have been coded. For instance one may restart all coding rules after coding 15 symbols. Or one may restart one coding rule, for instance the "m" coding rule when 15 symbols have been coded.

Restart with New Coding Rule

It is another aspect of the present invention to code a first part of a message with a first rule, and start coding a second part of the message with a second coding rule. The second coding rule may be a variation of the first coding rule, wherein for instance a different transposition rule is applied, but still using the same distribution of symbols. It is also possible to create a new coding rule by determining the distribution of symbols over a next plurality of symbols and to develop a coding rule that flattens or distorts the distribution of symbols.

Symbol Stuffing

It is possible that a certain symbol in a specific message does occur only once while others appear at least 40 times. In such a case it may be attractive to provide an additional number of the certain symbols as stuffing symbols to further flatten a distribution. In many cases such certain symbols may be distributed over a message and appear as distinguishable errors that can be ignored. They can also be inserted on known places. Further multi-symbol coding combined with a transposition will hide stuffing symbols in the message.

Digram and N-Gram Coding

Certain combinations of letters or symbols especially over longer messages are difficult to hide. For instance "ing" of the gerund form can be a tell-tale marker. The same with articles such as "the". One may treat combinations of two or more symbols as a known symbol which will be multi-valued coded.

All the above rules are fully reversible and are able to recover the encoded symbols. One should again keep in mind that the multi-valued coding is intended to skew, flatten or distort the true statistical distribution of symbols in a message. Accordingly it should be preceded by a robust coding scheme or it should be followed by a further strong and robust coding scheme. The multi-valued coding will make cryptanalysis on the basis of statistical properties of the symbols in a message much more difficult.

It should be clear that coding rules have to be developed on the basis of the language, application and message, wherein a message is any datafile that can be coded. A language can be a real language such as English, French, Spanish, German, Chinese, etc. However a language can be considered any set of symbols applied to a datafile or a message, which can for instance be strictly in numbers. Accordingly an alphabet in the context of a distribution of symbols over a message can be considered a language.

In an illustrative example the above message "meemm mamem emame meme" has 20 3-valued symbols from an alphabet {m, e, a}. One can scramble this message with a 3-valued scrambler, such as an LFSR scrambler. One may also scramble the message with a higher valued scrambler such as a 7-valued scrambler. One may also scramble the modified message "jacke bhgij dkfea bcgid" which has 11 different symbols with an 11-valued or higher valued scrambler, such as an LFSR scrambler. All scrambled messages can be descrambled and all coded messages can be decoded.

It should be clear that all aspects of the present invention can be executed automatically by a computer program.

Furthermore, the coding methods can be applied to stored data, to messages to be transferred over a transmission channel, to data stored on a storage medium, to media to be played as video or audio files, to data to be used in a database. The data can be text symbols, they can also be numerical symbols or logical symbols, or represent any other type of data. An n-valued symbol can be represented by a plurality of m-valued symbols with m<n. Accordingly one can code n-valued symbols into p-valued symbols with p>n. One can also code an n-valued symbol represented by k m-valued symbols into a p-valued symbol represented by i m-valued symbols with i>k.

One may actually distort the statistical make-up before higher valued coding by scrambling the message. FIG. 1 shows a 3-valued Linear Feedback Shift Register (LFSR) scrambler which has a matching descrambler. The message to be scrambled is inputted on input 100. The input is combined through a 3-valued function 101 with a signal provided by the LFSR. Both the functions 101 and 102 are as an illustrative example selected to be a self reversing ternary function 'sc3'. The truth table is provided in the following table.

| sc3 | 1 | 2 | 3 |
|-----|---|---|---|
| 1   | 3 | 2 | 1 |
| 2   | 2 | 1 | 3 |
| 3   | 1 | 3 | 2 |

Using m=1; e=2 and a=3 and an initial state of the shift register being [1 2 3 2] will code "meemm mamem emame meme" into "aeaee aemea eamem maeem". Equalizing or flattening the distribution of this message with higher valued coding will create a different result.

One may add to further confusion of the cryptanalyst by using a 4-valued function. It should be clear that 3 symbols may be selected from a group of 4 symbols. One may thus replace the 3-valued functions by 4-valued functions and allow the register to store 4-valued symbols. The truth table of the 4-valued function 'sc4' is provided in the following table.

| sc3 | 1 | 2 | 3 | 4 |
|-----|---|---|---|---|
| 1   | 4 | 3 | 2 | 1 |
| 2   | 3 | 2 | 1 | 4 |
| 3   | 2 | 1 | 4 | 3 |
| 4   | 1 | 4 | 3 | 2 |

Using the same initial state of the shift register [1 2 3 2] and assuming that 4 represent symbol 't' one will get as a scrambled result: "aeaem amtte amtem eaaea". Again one can equalize or flatten the statistical distribution of symbols by higher valued scrambling and/or coding.

One may code a symbol as a binary byte. This means that 256 symbols can be used. There is no real limitation to the number of symbols. For instance one can use 10 bits to code a symbol, which allows 1024 different symbols. It should be clear that a higher bandwidth or a longer time is required to code a message which uses more symbols.

It is again pointed out that the methods here provided can be used to flatten or skew the statistical distribution of symbols. The methods by themselves may not provide sufficient security. Higher valued coding should preferably be preceded or followed by other coding methods. For instance one may use asymmetric key methods by for instance applying the RSA algorithm, or DSS or Elliptic Curve techniques. Known encryption protocols are for instance PGP and GNU Privacy Guard. One may also use symmetric coding algorithms such as DES. Or one may use any other encryption method.

One issue may be how to get the selected multi-valued coding method to the receiver. One may hide information within a coded message. One may also agree before hand on a selected statistical skewing method.

Figure 2:
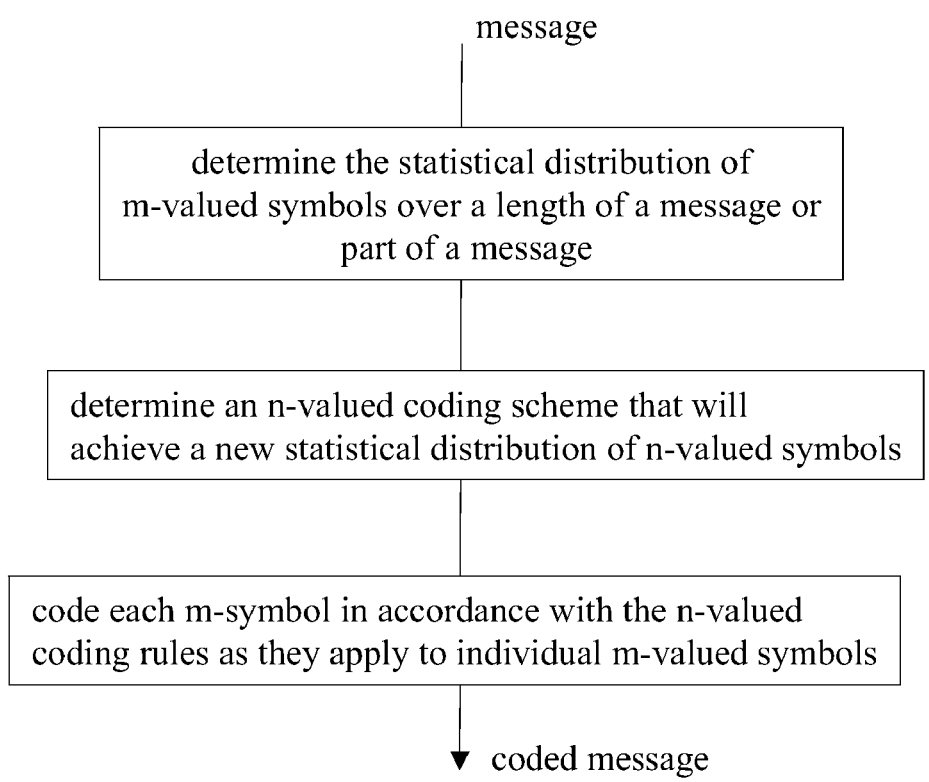
FIG. 2 illustrates the coding method by a flow diagram.

FIG. 2 shows a flow diagram of the method. A message (which may be a clear text message or a message that was already coded) of m-valued symbols may be analyzed on the distribution of occurrence of symbols. In a next step one may assign by way of a computer program an n-valued code. For instance one may instruct a computer program to assign higher valued symbols in such a way that all symbols occur about the same number of times. Other distributions are also possible. One may also use a pre-determined n-valued coding scheme. One may further, as part of the coding scheme, perform a transposition on the m-valued to n-valued coding scheme. In the next step one may then perform the m-valued to n-valued coding step. If one has a pre-determined coding scheme then one does not have to perform the analysis and design and the coding can be performed immediately.

One aspect of the present invention is to assign a unique n-valued symbol to each m-valued symbol in a message. The value of a symbol may indicate its position in a sequence as well as its value in an alphabet. One should make sure that each symbol will have a unique value.

Another approach can be to add in the example more "a" symbols as to make the number of symbols about equal. This may be the case in a pre-determined coding method wherein a flattened distribution can only be achieved in approximation. This can be achieved by randomly inserting symbols. One familiar with a language will immediately recognize the spelling errors. However when one is not familiar with a language and its alphabet, or the message has very specific numbers then it is difficult to not distort the message. One has then to agree where to put added symbols in a message. This is certainly possible. However it is not the preferred method of this invention. Rather than add symbols to a message the preferred approach is to add symbols to the alphabet and recode the existing message with the new alphabet.

One may use a multi-valued coding approach to a message using an alphabet with 2 symbols (usually 0 and 1). Herein one may decide that for instance in a message of 100 0s and 1s that a 1 will be coded into 7 symbols and a 0 will be coded into 5 symbols. This will change the statistical distribution of symbols and can make cryptanalysis more difficult. Other multi-valued coding schemes are also possible.

As another example assume one has a message of 1000 symbols using an alphabet of 10 symbols with the distribution of symbols [s1 s2 s3 s4 s5 s6 s7 s8 s9 s10]=[300 200 100 100 100 50 50 50 40 10]. A proposed (automatic) multivalued coding rule to create a close to uniform distribution can be one wherein no symbol appears more than 10 times:

s1→30 symbols s2→20 symbols s3→10 symbols s4→10 symbols s5→10 symbols s6→5 symbols s7→5 symbols s8→5 symbols s9→4 symbols s10→1 symbol This means that the 10 state alphabet has been modified to a 100 state alphabet. This may mean that instead of using 4 bits for a symbol one now has to use 7 bits for a symbol. One may generate a coding rule by first creating a linear rule of mapping an occurrence of a symbol to a new symbol. As an example the coding rule for s1 may be shown to be [s1 s1 s1 s1 s1 s1 s1 s1 s1 s1 s1 s1 s1 s1 s1 s1 s1 s1 s1 s1] to [s11 s12 s13 s14 s15 s16 s17 s18 s19 s110 s111 s112 s113 s114 s115 s116 s117 s118 s119 s120]. In a next step the coding rules may be concatenated in a sequence and one may scramble the sequence by transposition, thus maintaining the statistical distribution of states of symbols in the developed coding rule.

The coding can be performed by a processor enabled to store and execute instructions upon inputted symbols for instance from a memory and create a coded message which may also be stored in a memory or on a storage medium. The coded message may be provided to a next stage of coding or may be outputted for storage or for transmission.

All coding methods herein are reversible. This means that an m-valued symbol with a certain value or state in a message may be coded into different n-valued symbols; however no other m-valued symbols with a different state can be coded into those n-valued symbols. For instance in the example a 'm' may be coded into 'j', 'k' or 'e' for instance. However no other symbols of the original alphabet {m,e,a}, meaning 'e' and 'a' may be coded into those symbols under a single coding rule.

Figure 3:
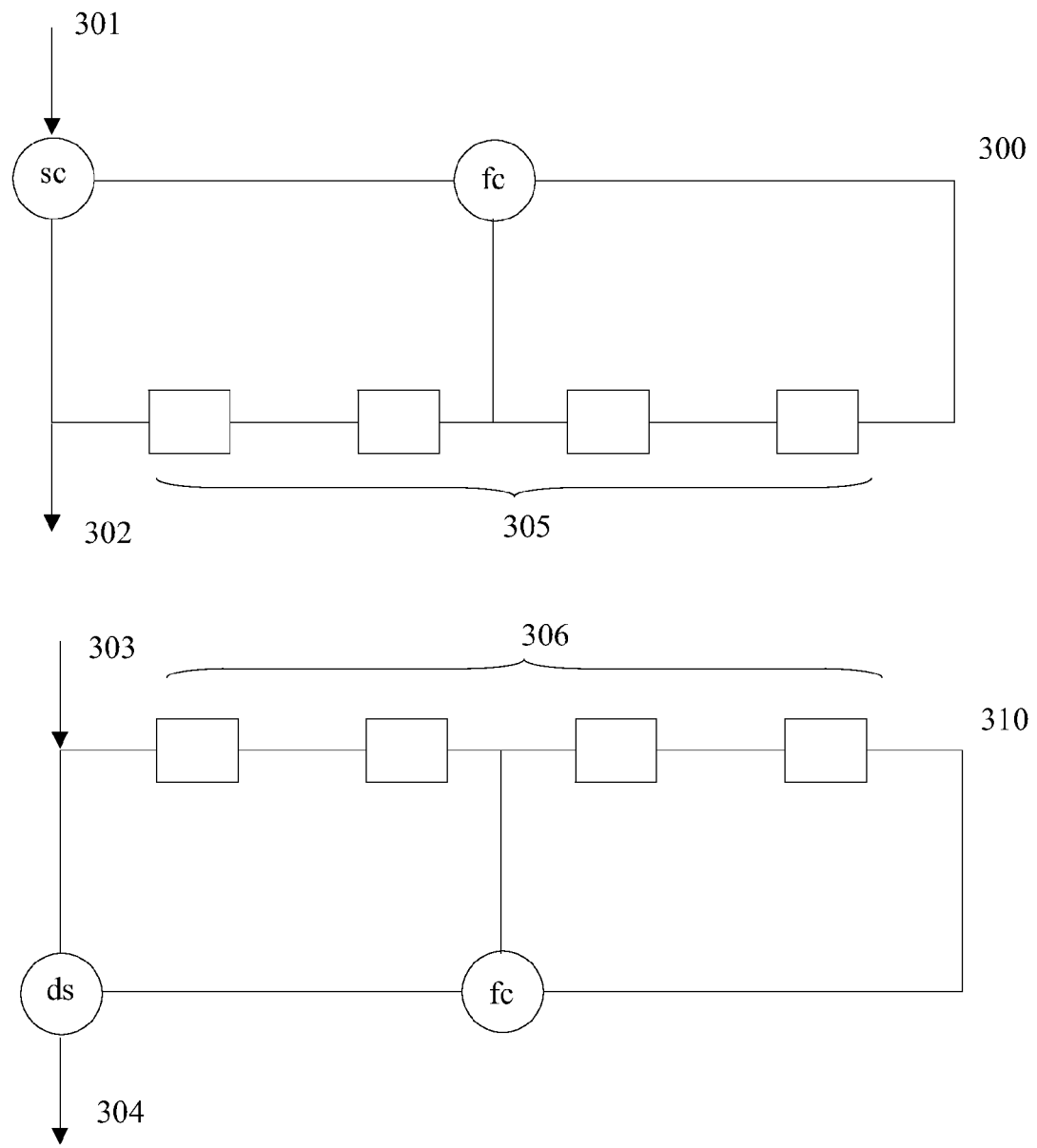
FIG. 3 illustrates an LFSR based scrambler/descrambler combination.

One may apply as an aspect of the present invention different type of scramblers to scramble a message of n-valued or n-state symbols. An n-valued scrambler/descrambler combination is shown in FIG. 3. herein an n-state scrambler 300 with an n-state shift register 305, an n-state logic device implementing an n-state function fc, and an n-state device implementing an n-state scrambling function sc. A sequence of n-state symbols is provided on 301 and a sequence of scrambled n-state symbols is provided on 302. A corresponding descrambler 310 is provided with a shift register 306, an n-state logic device implementing an n-state function fc, and an n-state device implementing an n-state descrambling function ds. A sequence of scrambled n-state symbols is provided on 303 and a sequence of descrambled n-state symbols is provided on 304. The LFSR of the scrambler and descrambler are in Fibonacci configuration and the descrambler is self-synchronizing. These n-state or n-valued scramblers/descramblers were disclosed by the inventor in U.S. patent application Ser. No. 10/935,960 filed on Sep. 8, 2004 which is incorporated herein by reference in its entirety.

Figure 4:
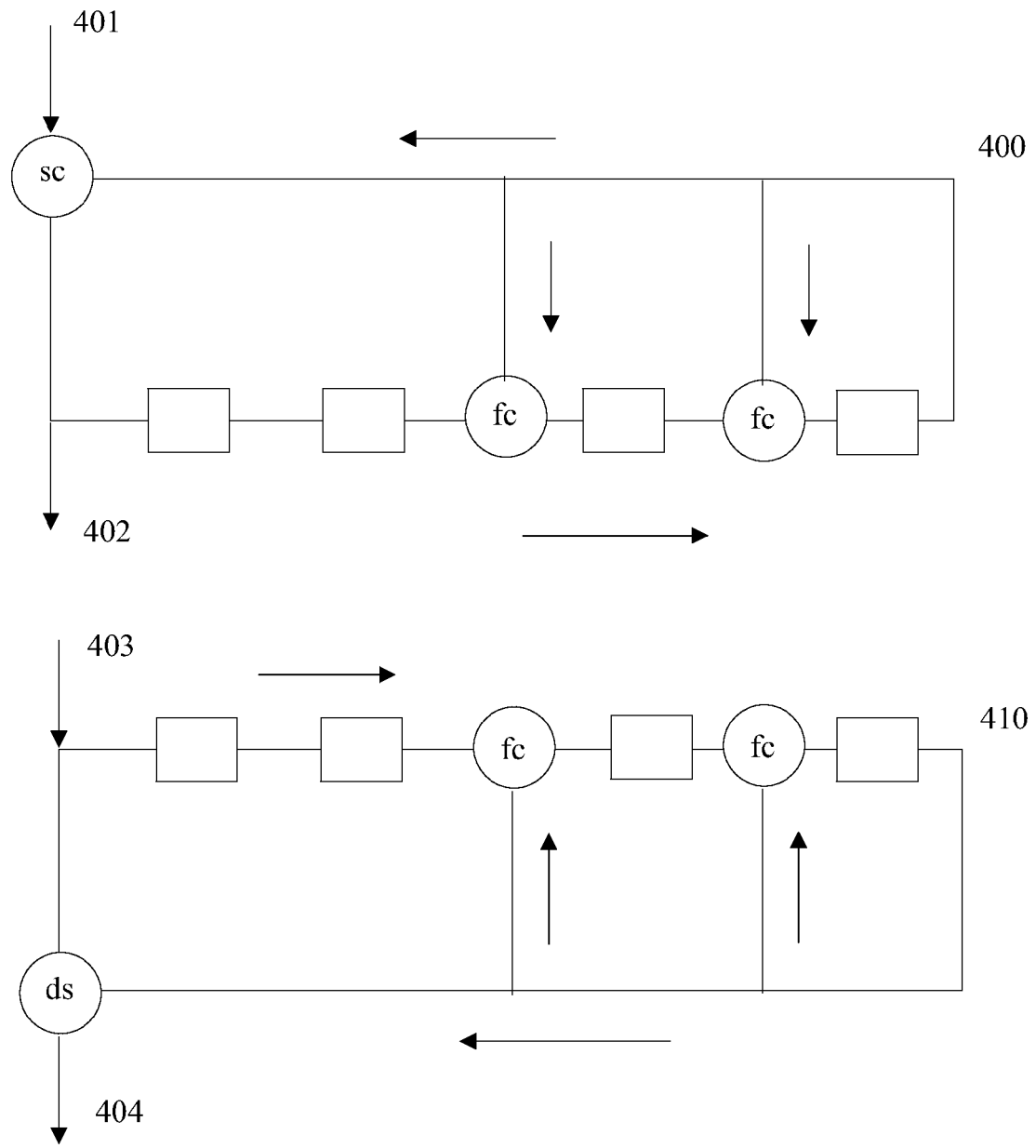
FIG. 4 illustrates another LFSR based scrambler/descrambler combination.

In accordance with a further aspect of the present invention an n-valued scrambler is used that has a descrambler that will propagate an error. In general a descrambler in Fibonacci configuration will flush an error. In accordance with an aspect of the present invention one may actually introduce an error that propagates. Unless one knows where the error is, all data after an error may be garbled and provide no real information. As an example one may use as a message "meemm mamem emame meme". Using m=1; e=2 and a=3 and an initial state of the shift register being [1 2 3 2] will represent "meemm mamem emame meme" as "1 2 2 1 1 1 3 1 2 1 2 1 3 1 2 1 2 1 2". One may scramble and descramble this message with a Galois scrambler 400 and descrambler 410 respectively as shown in FIG. 4. The message may be provided on 401 and its scrambled version is provided on 402. The scrambled message may then be provided on 403 and the descrambled message is provided on 404. The functions fc, sc and ds are the reversible function provided by the following truth table.

| sc3 | 1 | 2 | 3 |
| --- | --- | --- | --- |
| 1 | 3 | 2 | 1 |
| 2 | 2 | 1 | 3 |
| 3 | 1 | 3 | 2 |

Assume the initial shift register content to be [2 3 1 3]. The scrambled message is then: "1 2 1 3 2 3 3 2 1 1 1 1 2 3 3 2 3 2 2" or "memae aaemm mmeaa eaee". By changing the initial setting of the shift register for instance to [2 3 1 1] the descrambled message is: "3 3 3 1 2 3 2 1 1 2 3 1 1 3 1 1 1 2 3" or "aaame aemme ammam mmea". One may insert a 3=a at the beginning of the scrambled message before transmission, to create "3 1 2 1 3 2 3 3 2 1 1 1 1 2 3 3 2 3 2 2". Descrambling this message, applying the correct initial setting generates "3 2 3 3 3 3 1 2 2 3 1 3 3 2 1 1 2 3 1 3" or "aeaaa ameea maaem meama" which is significantly different from the original message.

As a next step a cipher will be created wherein each symbol in a cleartext message is coded into a unique n-state symbol. This is the ultimate uniform distribution as each code symbol appears exactly once. This is only possible if an alphabet of coded symbols has at least as many symbols as being present in the message. It is clearly not reasonable, though not impossible to create codes and messages that match exactly in number of symbols. It is easier to create a code that has more n-valued symbols than a cleartext message. A standard page of text may have 4000 or more characters or symbols including spaces and punctuation. Assuming that a cleartext message has 26 lower case characters and 26 upper case characters and punctuation marks, spaces and at least 10 digits one may assume that there are at least 100 different symbols which may appear at least once. Assume that spaces and 'e' and 't' and other statistically often recurring symbols will occur at most 15% of the total number of symbols, or 600 occurrences of a single class may occur. To be at the safe side, one will be all right if one has at least 100*600=60,000 symbols to code from. For convenience binary representation will be applied, though this is not a required limitation for this method of coding, which is an aspect of the present invention. In this case 64,000 or 16 bits symbols will be sufficient to code each symbol in a cleartext message to a unique 16 bit symbol.

Such a coding is of course not very efficient for transmission purposes. However, presently people on a regular basis transfer video and PDF format files for instance attached to an e-mail. The transfer of 4000 symbols coded in a 24 bit symbol is equivalent to a mere 12 kByte, which is insignificant compared to some of the sizes of for instance a video file.

Even with each symbol being represented as a word of 16 bits one may still provide important information to a cryptanalyst. For instance, one may create an alphabet of 600 symbols 'e'. Without further scrambling, one may easily distinguish that consecutive words of symbols occur. For instance the message "ameea" may be analyzed as having symbols of n bits words reflecting "v1 u1 w2 w3 v2". One may thus start out with an ordered alphabet: first all 'a' symbols, then 'b' symbols, etc. However, in a next step one should scramble such an ordered alphabet to get rid of a distinguishable order.

As an illustrative example one can apply an alphabet {a,b,c,d,e} to a message of 20 symbols. One may assume that each symbol will not appear more than 16 times. That means a cipher or code-book that has at least 80 symbols. One may provide such a codebook in binary words. This means that each symbol can be coded into a 7-bits word. If one provides an ordered codebook it may look line:

Code for 'a' →[0 1 2 3 4 5 6 7 8 9 10 11 12 13 14 15]

Code for 'b' →[16 17 18 19 20 21 22 23 24 25 26 27 28 29 30 31]

etc.

A cryptanalyst or a program doing an analysis may assume in a message that has only unique numbers that two consecutive numbers represent either two identical symbols or form a 'jump' between a first and a second symbol. One should not provide such valuable information.

As an example one may use the following cleartext message of 50 symbols using the alphabet {a,b,c,d,e} [aadae cedbe cadec cdaac baade dbdad dbeae bcccb adcce dbbce]. The occurrences of the symbols are:

a=11 b=8 c=11 d=11 e=9

One may thus code the message using a unique 9 bit word for each symbol. One may actually code with a word of 6 bits (or maximum of 64 different symbols). For reasons that will be explained below a higher number of bits (9 bits) is selected for this example. The next step in accordance with an aspect of the present invention is to assign a 9 bit word to each symbol in a random way.

There are several ways to address this problem. The number of symbols is quite significant, even in the relatively simple illustrative example. It is almost impossible to create a random alphabet manually. In accordance with a further aspect of the present invention, randomization will take place by using an n-state Linear Feedback Shift Register or LFSR. The n-state LFSR may be implemented in binary form. One may apply an LFSR in a pseudo-random generator configuration to scramble and initial alphabet. One may also apply an LFSR bases scrambler to scramble an initial alphabet. The LFSR based scrambler may create identical codewords from a sequence with all different codewords. This is preferably not a first step of randomizing an alphabet.

In accordance with an aspect of the present invention in a first step one may randomize the alphabet with an LFSR generated sequence. In the illustrative example one would then have to generate a random sequence of at least 50 different symbols. Such a randomization has to be reversible in order to recover the original alphabet.

For instance, a 3-valued maximum-length sequence generated by a 3-valued LFSR having a shift register with 4 elements would generate a 3-state maximum length sequence of 80 3-state symbols. It was shown earlier by the inventor in U.S. patent application Ser. No. 11/427,498 filed on Jun. 29, 2006 and in U.S. patent application Ser. No. 11/534,837 filed on Sep. 25, 2006 which are both incorporated herein by reference how a maximum length (ML) n-state sequence is formed by overlapping unique words. Accordingly, a 3-state maximum-length sequence of 80 symbols formed by a 4-element LFSR has 80 overlapping words of 4 3-state elements. One may achieve a similar result with a binary ML sequence of 6 elements, generating an ML of 63 bit and having 63 overlapping binary words. For instance using an LFSR which implements the irreducible polynomial over GF(2) which is characterized by 1000011 and which is seeded with initial LFSR stage [1 0 0 1 1 0] will generate a sequence with the overlapping 6-bits words [42 21 43 23 47 31 63 62 60 56 48 32 1 2 4 8 16 33 3 6 12 24 49 34 5 10 20 41 19 39 15 30 61 58 52 40 17 35 7 14 28 57 50 36 9 18 37 11 22 45 27 55 46 29 59 54 44 25 51 38 13 26 53] wherein each word is represented by its decimal equivalent.

One way of coding in the illustrative example is then for instance to use all consecutive 11 symbols 'a' and transform these into the first 11 symbols of the generated sequence, as [a aaaaaaaaa a]=[42 21 43 23 47 31 63 62 60 56 48]. It is easy to see that one may reverse such a coded alphabet. The problem with this single ML coding is that the ML has some signature occurrences. For instance the sub-sequence 1 2 4 8 may be a signature for this ML.

One way to diminish the risk of exposing signatures of an ML is by recoding the sequence of 63 words with a second or even more MLs. The easiest is to code with another sequence of 63 words, though one may also use other MLs. It is required that the second or other MLs are also reversible. For instance one may apply a second ML generated by the LFSR implementing irreducible polynomial over GF(2) characterized by 1011011 and with initial stage [0 1 0 1 0 1]. This will generate [12 25 51 39 15 30 61 59 55 46 29 58 53 43 22 45 26 52 41 19 38 13 27 54 44 24 49 34 4 9 18 36 8 16 33 3 7 14 28 56 48 32 1 2 5 11 23 47 31 63 62 60 57 50 37 10 21 42 20 40 17 35 6]. Using the second ML as the index to the first ML will generate [32 38 1 27 23 18 6 35 40 10 47 36 12 25 39 59 45 8

51 30 58 54 31 16 15 46 19 48 41 28 22 9 17 42 60 56 26 33 61 43 34 21 63 3 55 52 7 29 13 5 49 37 11 4 20 50 2 44 62 14 53 24 57].

One may then use [a a a a a a a a a a a]=[32 38 1 27 23 18 6 35 40 10 47]; [b b b b b b b]=[36 12 25 39 59 45 8 51]; [c c c c c c c c c c]=[58 54 31 16 15 46 19 48 41 28 22]; [d d d d d d d d d d]=[9 17 42 60 56 26 33 61 43 34 21]; and [e e e e e e e e]=[63 3 55 52 7 29 13 5 49]. Because there are more symbols in the ML sequence than in the required set of symbols, one does not have to select contiguous sets of symbols.

The illustrative message [aadae cedbe cadec cdaac baade dbdad dbeae bcccb adcce dbbceb] can be displayed for coding purposes as [a1a2d1a3e1 c1e2d2b1e3 c2a4d3e4c3 c4d4a5a6c5 b2a7a8d5e5 d6b3d7a9d8 d9b4e6a10e7 b5c6c7c8b6 a11d10c9c10e8 d11b7b8c11e9] can then be coded as [(32 38 9 1 63) (58 3 17 36 55) (54 27 42 52 31) (16 60 23 18 15) (12 6 35 56 7) (26 25 33 40 61) (43 39 29 10 13) (59 46 19 48 45) (47 34 41 28 5) (21 8 51 22 49)].

One may also apply different MLs generated from different bases. For instance one may start with an 80 word 3-state ML. Such a 3-state ML may have its words represented as [31 14 44 51 73 57 11 35 24 72 56 7 22 67 39 37 32 15 45 55 3 9 27 1 4 13 40 41 42 46 59 16 49 68 43 50 69 47 60 20 62 25 76 66 38 33 19 58 12 36 28 5 17 53 78 74 61 21 63 29 6 18 54 2 8 26 80 79 75 65 34 23 71 52 77 70 48 64 30 10]. One may code for instance the earlier 63 2-state ML to the 80 3-state ML. This may happen in different ways. One only has 50 symbols to code while the 63 2-state sequence has 63 symbols. In one embodiment one may insert 13 dummy or null symbols, which will not be used in a message.

One may also apply as an illustrative example the first 50 contiguous symbols as a sequence of symbols in the 63 2-state sequence. A position in that sequence starts with i=1 in the first position, till i=50 for the last symbol. The symbol at i=1 in the binary sequence is 42; the symbol at i=2 is 21; etc. To apply the 80 word 3-state sequence the value of a symbol at i=1 is interpreted as the index or position of the symbol in the 80 3-state ML sequence. Accordingly, the symbol at i=1 is 42 translates to the value of the symbol at position 42 in the 80 3-state sequence, which is 25. The symbol at i=2 in the 2-state sequence is 21 translates into 3. Accordingly, the first 50 symbols in the first 63 2-state ML sequence translates via the 80 3-state sequence into: [25 3 76 27 19 59 54 18 29 74 58 16 31 14 51 35 37 49 44 57 7 1 12 68 73 72 55 62 45 60 39 46 6 21 5 20 32 43 11 67 41 61 36 50 24 15 69 56 9 38].

Because the ML sequences of words are reversible one can reverse the coding process for any number of applied ML sequences no matter the base or the length.

In a further embodiment one may scramble a coded message with an n-state scrambler. Such a scrambler may be an n-state LFSR based scrambler. The scrambler may use an n-state reversible 2-input scrambling function. The to be scrambled sequence (message) may be inputted on one input of the function. A known sequence, for instance generated by an LFSR based sequence generator may be provided on the other input of the scrambling function. The scrambled message will be provided on the output of the function. By using the same sequence generated by the sequence generator and applying a function that reverses the scrambling function the scrambled message may be descrambled.

A practical concern in creating an n-state scrambler may be the use of n-state functions. For instance the creation of an 80-state or 81-state reversible function may pose a challenge in some situations. It may be easier in some cases to create a binary equivalent of an n-state function. It is known that an adder over $GF(n=2^p)$ is a self-reversing function which can be implemented by using for instance p XOR functions. How to create different $n=2^p$-state implementations with reversible binary functions is shown by the inventor in U.S. patent application Ser. No. 12/137,945 filed on Jun. 12, 2008 which is incorporated herein by reference in its entirety.

Figure 5:
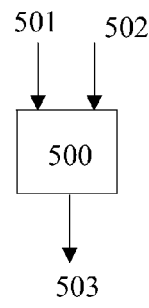
FIG. 5 illustrates an implementation of a reversible binary logic functions.
Figure 6:
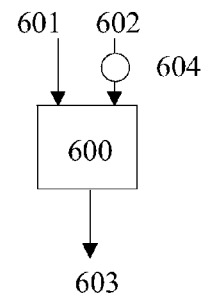
FIG. 6 illustrates another implementation of a reversible binary logic functions.

In general the literature only shows the XOR function for implementations of $n=2^p$-state functions. This is shown in FIG. 5. A device 500 implements a XOR function 500 with inputs 501 and 502 and output 503. FIG. 6 shows how the XOR 600 with inputs 601 and 602 and output 603 can be modified to implement the EQUIVALENT (or =) function by inserting a binary inverter 604. One may insert 604 also in input 601 or output 603 to change the XOR into an EQUIVALENT function.

Figure 7:
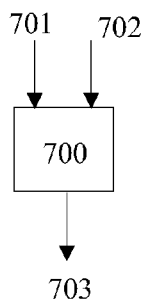
FIG. 7 shows an illustrative example in diagram of a 64-state scrambler in binary form.

FIG. 7 shows as an illustrative example a diagram of a 64-state scrambler, wherein a 64-state signal is represented by 6 bits ($64=2^6$). The scrambler may contain 6 2-input/single output devices, each implementing an XOR or an EQUIVALENT function. A device 700 has an input 701 and an input 702 and an output 703. One input, for instance 701 is enabled to receive one of the bits representing the 64-state or 6-bits signal. The input 702 is enabled to receive a bit against which the bit of 701 will be scrambled. The bit provided on 702 may come from a known source (for instance from a generated ML sequence) or from an LFSR feedback.

Figure 8:
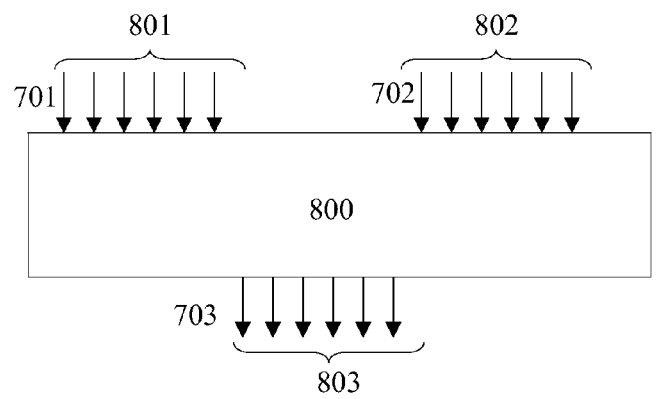
FIG. 8 shows another illustrative example in diagram of a 64-state scrambler in binary form.

An n-state scrambler with $n=2^p$ in binary form may be depicted in a diagram as shown in FIG. 8. The scrambler may implement a reversible n-state function in a device 800. Such a function may be for instance an adder over GF(n). It may also be any other reversible n-state function that can be implemented in binary logic. The scrambler has a first n-state input 801 which may be represented by p binary inputs, for inputting the n-state signal that needs to be scrambled. Compared with the scrambler of FIG. 7 group 801 includes input 701. The scrambler of FIG. 8 has also a second input 802, which may be represented by a group of p binary inputs for receiving an n-state signal to be scrambled against. Compared with the scrambler of FIG. 7 group 802 includes input 702. The scrambler of FIG. 8 provides a scrambled n-state signal on output 803 which may be represented by a group of p binary outputs. Compared with the scrambler of FIG. 7 group 803 includes output 703.

Figure 9:
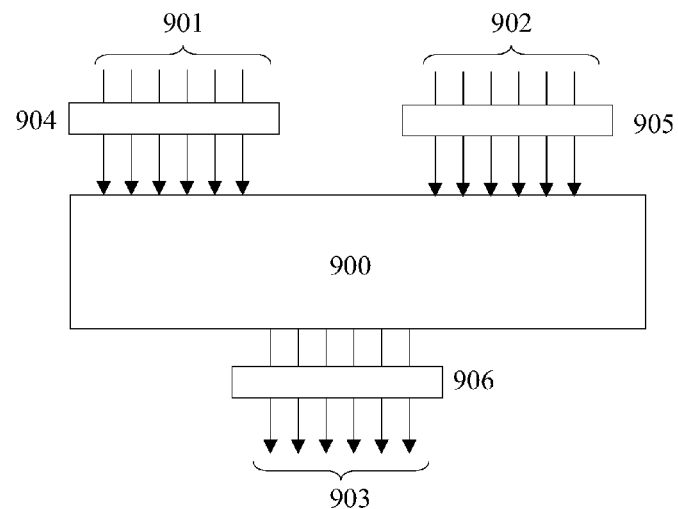
FIG. 9 shows yet another illustrative example in diagram of a 64-state scrambler in binary form.

FIG. 9 shows a diagram of a more general form of an n-state scrambler with $n=2^p$. Herein the device 900 may apply only XOR or EQUIVALENT functions and it combines a bit from the to be scrambled p-bit word with a bit of a p-bit word against which it will be scrambled. The n-state to be scrambled signal is provided in p bits on input group 901. The n-state signal against which the to be scrambled n-state signal will be scrambled is provided in p bits on input group 902. The scrambled n-state signal is provided in p bits on output group 903. In the more general $n=2^p$-state scrambler every p bit group be it on an input or an output may be inverted by an $n=2^p$-state reversible inverter. The $n=2^p$-state reversible inverters are identified as 904, 905 and 906. Such an inverter may be implemented by a combinational binary circuit with 8 inputs and 8 outputs; it may also be implemented with a memory based binary transformation table.

Figure 10:
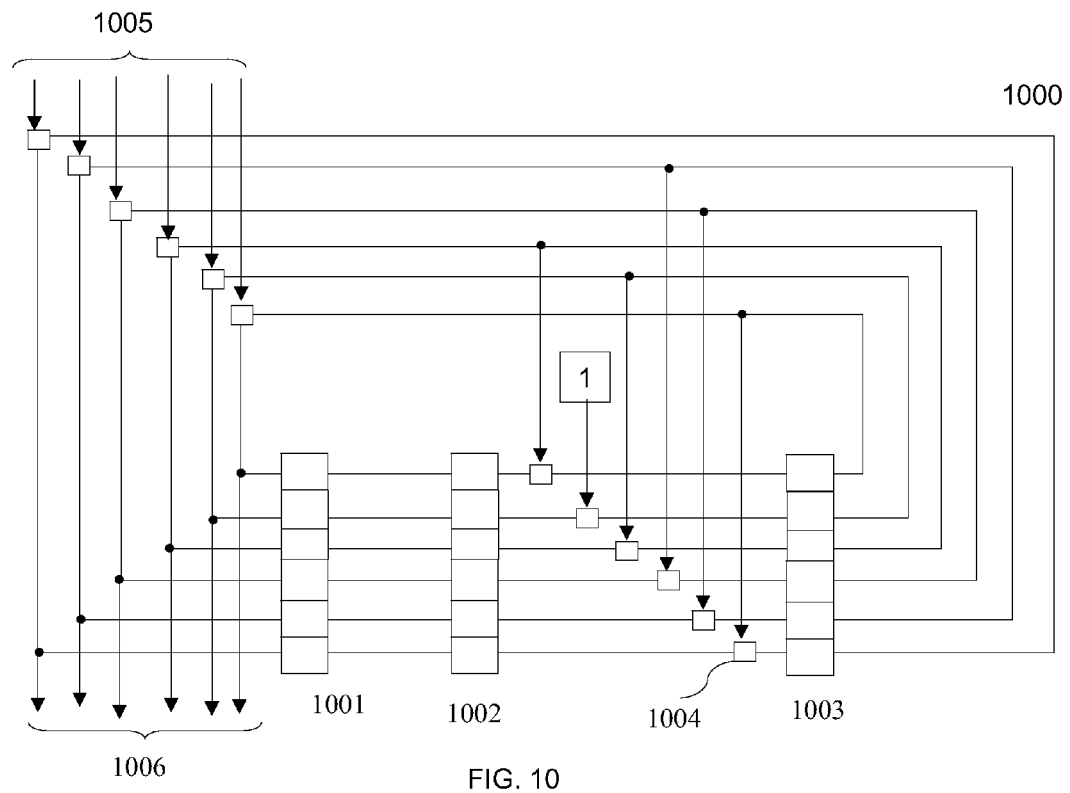
FIG. 10 shows yet another illustrative example in diagram of a 64-state scrambler in binary form.

FIG. 10 shows a 64-state scrambler 1000 in binary realization wherein each 64-state symbol is processed as a 6-bit word. The scrambler is in a Galois configuration that is not self-synchronizing. One should in that case carefully manage initial states of the shift register. The LFSR has a 3-state shift register, with elements 1001, 1002 and 1003. Each element in enabled to store and shift a 6-bit parallel word. One may also realize the scrambler in serial mode. In that case 6 clock cycles are required to process a 64-state symbol. In its simplest form the scrambler may be realized from 6 parallel and unconnected binary scramblers. However, such an obvious structure is not very secure and may be prone to reveal certain patterns. By cross-connecting the different loops of the binary LFSRs the scrambler has a stronger scrambling performance. The basic binary processing element herein is a device implementing a XOR or an EQUIVALENT function, which is indicated by a small square 1004 in FIG. 10. It is not required that all loops have a feedback (with or without cross-connection). One may also leave a loop open or connect a tap with a fixed source representing a logic 1, as is shown in FIG. 10. This is equivalent with replacing the connecting XOR function with a binary inverter.

The 64-state symbol is inputted as a 6-bit word on 1005. The scrambled signal in 6-bit form is outputted on 1006. One may transform the outputted word in an actual 64-state signal. For instance one may modulate a word of p bits into a $2^p$ symbol in a QAM-$2^p$ constellation or in one of $2^p$ phases in a Multi-Phase Shift Keying scheme. Other modulating schemes, including PAM, PCM, PPM and the like are also fully contemplated.

As an illustrative example one may scramble the earlier message: [(32 38 9 1 63) (58 3 17 36 55) (54 27 42 52 31) (16 60 23 18 15) (12 6 35 56 7) (26 25 33 40 61) (43 39 29 10 13) (59 46 19 48 45) (47 34 41 28 5) (21 8 51 22 49)] into [(3 40 51 64 39) (52 10 3 13 9) (9 46 63 38 46) (45 12 35 39 27) (52 27 7 24 14) (44 19 26 54 51) (6 37 59 28 53) (58 35 17 3 62) (39 20 9 45 9) (47 23 35 36 58)]. The initial state of the shift registers are 1001 has content decimal 46; register element 1002 has content decimal 56; and register element 1003 has content decimal 29. A matching descrambler just reverses the inputs 1005 and output 1006 and the direction of the signal flow consequently. By using the same initial content of the shift register one can descramble the scrambled signal to its original form.

The scrambler adds to the confusion as it allows certain symbols to appear twice or more while having dissimilar meaning. One may determine an auto-correlation graph of the scrambled message. Such a graph still looks very much like a graph of a random sequence. Different configurations of scramblers and descramblers in binary and non-binary form are fully contemplated.

In a further embodiment, one may create an ordered alphabet of m-state symbols, as for instance in the message [a1a2d1a3e1 c1e2d2b1e3 c2a4d3e4c3 c4d4a5a6c5 b2a7a8d5e5 d6b3d7a9d8 d9b4e6a10e7 b5c6c7c8b6 a11d10c9c10e8 d11b7b8c11e9] as [a a a a a a a a a a a b b b b b b b c c c c c c c c c c c d d d d d d d d d d d e e e e e e e e e]. Before creating a uniquely coded alphabet one may scramble the initial alphabet in one or more scrambling steps, for instance with m-state scramblers, possibly in binary word form, as described herein.

Split/Combine and Scramble/Descramble

Figure 11:
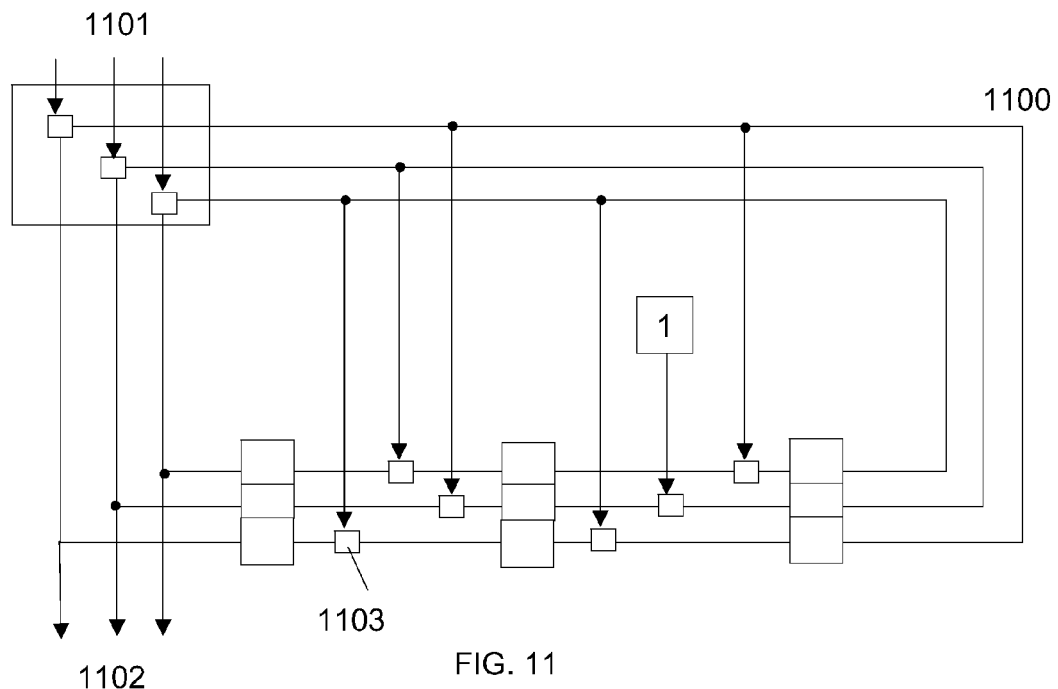
FIG. 11 shows a diagram of 3-bit word scrambler.

For instance as one may transmit 64-state symbols by modulating 6-bits word one may scramble 6-bit words as 2 3-bits words before transmission. An example of a 3-bit word scrambler 1100 is shown in FIG. 11. A 6-bit word may for instance be split up in a first 3-bit word and a second bit word which are scrambled consecutively. The 3-bits words are inputted on 1101 and outputted in scrambled 3-bit words on 1102. The devices 1103 may be implementations of XOR or EQUIVALENT functions. The stream of 50 G-bit words is thus treated as a stream of 100 3-bit words. The above message [(32 38 9 1 63) (58 3 17 36 55) (54 27 42 52 31) (16 60 23 18 15) (12 6 35 56 7) (26 25 33 40 61) (43 39 29 10 13) (59 46 19 48 45) (47 34 41 28 5) (21 8 51 22 49)] is divided into 3-bit words. The scrambled 3 bits words may be re-assembled into 6-bit words which represent then the 64-state symbols [(8 47 6 5 10) (5 44 22 56 33) (40 6 9 39 44) (55 32 46 50 57) (22 8 29 58 38) (9 33 40 56 40) (7 14 30 17 37) (29 19 64 40 7) (13 20 60 40 15) (59 41 63 51 45)]. The initial state of the 3 element 8-state shift register has decimal content 5, 6 and 3.

Figure 12:
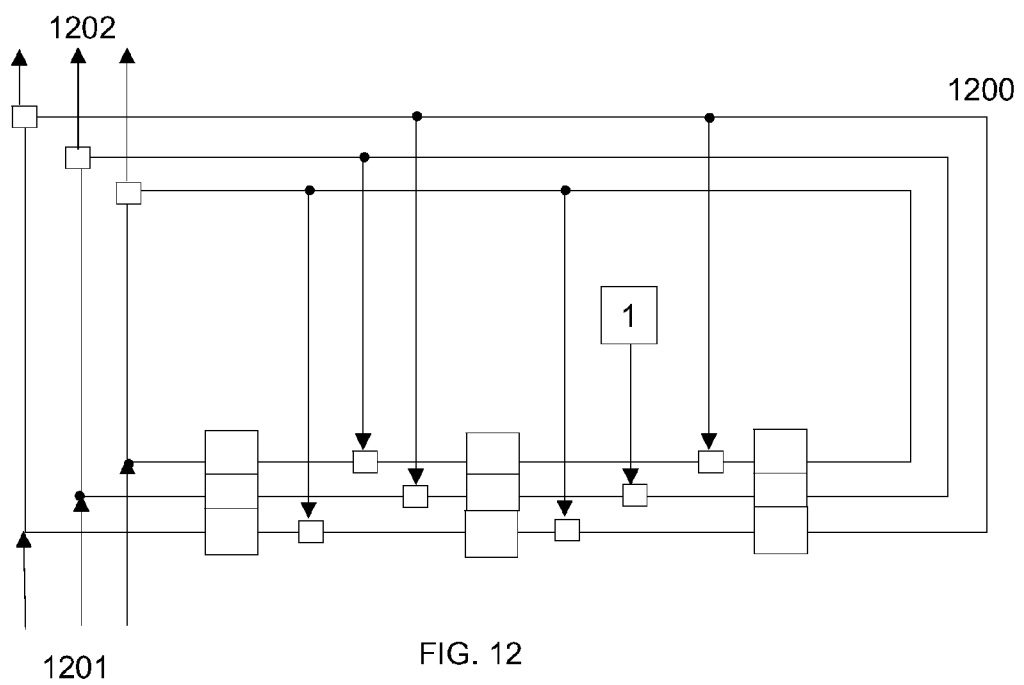
FIG. 12 shows a diagram of a 3-bit word descrambler.

One can descramble the scrambled 64-state symbols with descrambler 1200 in FIG. 12. One has to represent a scrambled 64-state symbol by 2 consecutive 3-bit words and descramble each 3-bit word by inputting it on inputs 1201 and outputting the descrambled 3-bit words on outputs 1202 and reconstruct a descrambled 64-state symbol from two concatenated 3-bit words. The initial state of the descrambler of FIG. 12 should be identical to the initial state of the corresponding scrambler in FIG. 11. All orders of inputs of bits and of words in scrambler and corresponding descrambler should also be identical.

As an illustrative example a 6-bit word is spilt up in 2 words of identical length. This is not required. One may for instance split up a word of for instance 12-bits in 3 words: one word of 3 bits one word of 4 bits and one word of 5 bits. One may scramble each word with different type of scramblers: LFSR-type scramblers or other types of scramblers. The only requirement is that each word can be recovered and can be re-assembled in a word representing the original n-state symbol. One may for instance modify the order of bits by a transposition rule.

By applying symbols represented by for instance 9-bits words one may apply different scramblers to parts of a split-up word. One may apply different word splitting schemes, for instance depending on the number of symbols that have been coded. For instance a first splitting scheme of a 9-bit word into 3 3-bit words may be applied to the first 300 symbols followed by a splitting scheme of 2 words of 5-bits and 4-bits for the next 150 symbols.

For example, if a symbol is coded as 9-bits, one may also combine 2 or more words into a 9-bits words but wherein each individual word is to be scrambled. For instance one may use 3 9-bits words and split and scramble as 11-bit word, 13-bit word and 3-bit word. The splitting and combining method followed by scrambling/descrambling and combining/splitting may be applied to any series of symbols with a length greater than 2 or equal to 2.

For illustrative purposes messages using symbols that may represent text are used above. It is to be understood that any message, including but not limited to a text message, a data message, an audio message, a video message or any message that applies symbols may apply the coding and/or decoding methods and systems disclosed herein as an aspect of the present invention. A symbol may for instance also represent a pixel in an image. It may also represent a sample of a signal such as an audio signal. It may also represent a number or a digit in a data file. Most messages will have a distribution of symbols that is not uniform. For instance, a text message in English will have more symbols 'e' than symbols 'z'. A message representing a phone conversation may have more periods with silence than any other amplitude of signal. A video signal recorded in a meadow in summer may have more 'green' pixels than 'red' pixels. Many signals that are to be transmitted have non-uniform distributions of symbols. These non-uniform distributions may provide a basis for compression coding.

However, even compressed signals will have non-uniform distributions of symbols. One may apply the coding methods and systems provided herein to create a more uniform distribution of symbols. It may be that n-state coding of m-state symbols with n>m may be easier to apply than unique coding of each symbol. Unique coding requires that the system knows how many symbols and which symbols are available. Clearly, that is very hard to do in real time for a large file. Analyzing large number of symbols may take so much time that a distinguishable delay is created. Large numbers of symbols may also may make the size of symbols in a m-to-n state coding transformation too large. For instance one may want to code in such a way that as many as possible coding symbols are applied in a coding run. This helps in ensuring that the signal energy is uniformly distributed. One may create codes or ciphers in accordance with a further aspect of the present invention that apply the methods or systems disclosed herein, but that apply to a limited number of symbols.

For instance a limited number of symbols may be a page of text, a single image, several milliseconds of speech or any number of symbols that can for instance be processed and coded in real-time. A system thus knows beforehand how many or about how many symbols one is going to code. As a further aspect of the present invention the system has at least two coding rules that it can apply. These coding rules may be designed for coding a set number of symbols. However these coding rules may be designed for two different distributions of symbols over a set of symbols with a known number of symbols. To provide a simple numerical example one may want to code a page of 4000 symbols or characters. Assume that there are two codes available. One is a code that provides a uniform (or even unique) coding rule for English text. A second coding rule may code for Spanish text. A coding rule may be characterized by the distribution of characters it expects. For instance in general in English text the letter 't' has a frequency of about 10% and in Spanish about 5%. One may characterize a coding rule for instance by a series of parameters that reflect the frequency of certain symbols that it will code for. If one has to characterize an English coding rule by the letter 't' that parameter would then be 10. The 't' parameter for a Spanish coding rule then would be 5.

In order to match a coding rule with a text in this example, one also has to characterize the text that is to be coded. To apply the above simple example, a computer program may count the number of 't' symbols and may determine the frequency of occurrences in the analyzed text. One may call the number of 't' symbols a determined parameter. The number of 't' symbol for which the coding rule is designed may be called the assigned parameter. One may thus assign a coding rule by optimally matching determined and assigned parameters. Because it is prudent to design a coding rule for more than the average number of expected occurrences, one may for instance provide the coding rule with the actual capability to design for double or triple or even more occurrences of certain symbols.

The example only applied a single symbol as a parameter. It should be clear that one may characterize a coding rule and a message for a whole range of parameters, if required even for all occurring symbols. This allows of course for unique coding. Assigning a coding rule based on the characteristics of symbol frequencies also applies to repetitive m-to-n coding rules. An optimal coding rule is a coding rule that codes an m-state symbol message into a coded n-state symbol message, wherein the distribution of the n-state symbols is as close as possible to a predetermined distribution, which may be a uniform distribution.

One may determine a parameter of a message of m-state symbols also based on a context or from a user provided context. For instance, a language may be provided or selected by a user, which implies a certain distribution of symbols. Also a distribution of m-state symbols having one or more different states but less than m states may imply the distribution of the remaining states. Thus a distribution may be implied, or estimated or even assigned. For the purpose of selecting a coding rule this will be assumed to also constitute 'determining' a distribution, even if such a determination is not accurate. An assigned coding rule most likely will still significantly change the distribution of n-state symbols in the coded message, though the coded may not be as uniformly distributed as is theoretically possible.

Figure 13:
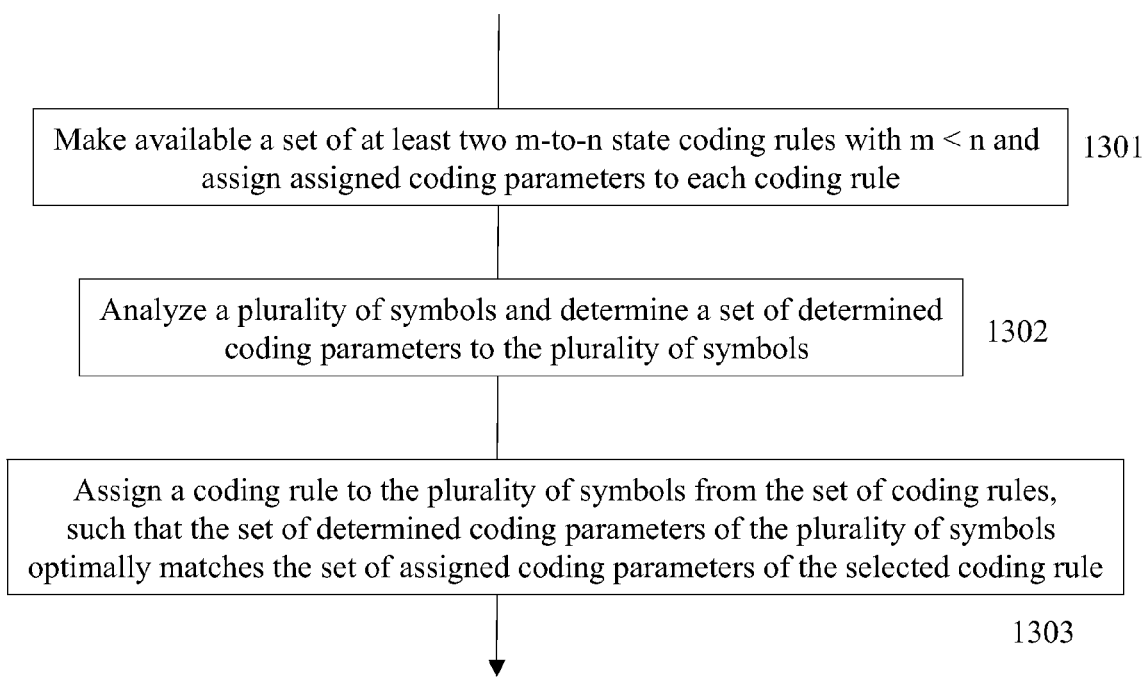
FIG. 13 is a flow diagram of a coding method in accordance with an aspect of the present invention.

The method of coding as explained above is shown in diagram in FIG. 13. In step 1301 at least 2 m-to-n coding rules with m<n are provided. The coding rules are characterized by assigned coding parameters. In step 1302 a system by means of for instance a computer program analyzes a message of a plurality of m-state symbols. The number of m-state symbols in a message may be pre-set. From the message a set of determined parameters are determined. In step 1303 a coding rule with assigned parameters best matching the determined parameters is then designated to code the number of m-state symbols.

One may provide parameters from a message that is to be coded by analyzing the message. For instance, the occurrence or frequency of occurrence of a symbol in the message may serve as a parameter. A symbol or a code representing such a measured frequency may also serve as a parameter. Such a parameter may be called a measured parameter. One may also measure relative change in symbols. For instance, a video message may be recorded from a static scene, which has limited changes between subsequent frames. Such information may be applied in creating 'matching' coding rules for such a message, especially if one codes without compression. Accordingly, if a video message has a parameter indicating a static scene, a computer program will search for a coding rule that matches as good as possible with a corresponding coding rule.

One may also have a user 'assign' a parameter, for instance a parameter from a menu indicating a language. One may apply such assignments also to for instance audio messages, whereby a user selects if an audio message is mainly speech or perhaps a music message. In any case, one may create a set of coding rules having assigned parameters that either match exactly with the parameters of a message or that are an approximation of the message parameters. In the latter case a computer program can make a selection from the coding rules by assessing which coding rule parameter or parameter set best approximates a message parameter or parameter set.

The parameter or parameter set of a selected or applied coding rule and/or an indication of a corresponding decoding rule may be provided as a preamble or heading to a message to alert the decoder how to decode. There are many ways to further code or hide such indicators or headers if secrecy is required.

One may make variations on a coding rule which do not fundamentally change the distribution of symbols, but which for instance for each new set of symbols in a message uses different initial settings for instance for LFSRs for each page of text for instance. Such changes may be pre-programmed. So, when a coding rule is selected, the coding rule may select new initial settings or reversible functions for instance each new page of text. The corresponding decoder is also programmed accordingly. For instance a basic coding rule in accordance with an aspect of the present invention may be selected. It may be that a message contains several pages or frames of symbols. One may then change the basic coding rule, for instance by re-applying the rule with different initial setting of an LFSR or applying different taps to an LFSR or by applying different initial scramblers or initial scrambler conditions. It is fairly easy to program those changes into a coding system. One may for instance pre-set that after coding a certain number of symbols pre-defined changes in a coding rule will be initiated. Such rule changes must of course also be defined and known in a decoding program.

While the coding may appear to be quite involved (and manually it is of course), the steps of coding and decoding can easily be implemented in a computer program. The above disclosed techniques can be applied. For security reasons one should limit the repeating using the same coding scheme or the same initial settings. For each coding run one may change the applied polynomials or ML sequences or at least the starting point of an ML sequence, or the initial setting of the LFSR of a sequence generator.

Coding and decoding methods as disclosed herein in accordance with one or more aspects of the present invention can be implemented and executed in instructions that can be stored in a memory from which it can be retrieved and executed by a processor. The memory and processor are thus part of a system for coding and/or decoding.

The coding and decoding method can be applied to any message that is represented as a series of symbols. Such a message can be a text message, a sound message, an image or a video message, a message containing general data symbols or any message that can be represented by a plurality of symbols. Coding and decoding may be applied to symbol based messages in a communication system. It may also be applied to a storage system that is being used for the storage and retrieval of messages.

For instance the coding may be applied to an audio message. One may have a set of coding rules for different languages for instance for English and for Spanish. The coding system may then select the coding rule based on the context of spoken language. Such a context may be provided by a user by for instance selecting from a menu. The system may also analyze samples of the audio signal and determine that the audio is Spanish or close to the distribution of Spanish. It may then select a coding rule that optimally codes for the Spanish language.

Such a context may also be provided for coding for instance a text. It may also be provided for an image or a video signal or for any message represented by symbols of which the distribution depends on a context.

A message may have a distribution of m-state symbols. Its coded message may have a distribution of n-state symbols. Substitution coding by applying a single or by a plurality of alphabets is known. As a simple example one may substitute the original alphabet of p symbols by a different coding alphabet of also p symbols. It is well known that the shape of the distribution of symbols in the coded message is identical to the distribution of original symbols. The distribution of symbols in the uncoded or cleartext message and the distribution in the coded message are identical. In an embodiment of the present invention the purpose is to create a distribution of symbols in a coded message that is substantially uniform or flat. For example an un-coded message may have a distribution of symbols that may look somewhat like a Gaussian or bell-shaped curve. A distribution of symbols in the coded message will show no such shape, but will preferably be flat.

In a further embodiment one may create a coded message with a distribution of symbols that looks like the distribution of the un-coded message, but does not reflect a one-to-one relationship between un-coded and coded symbols. For instance a distribution peak for the letter 'e' may appear in the distribution of symbols in an un-coded (cleartext) English language text message. One may create a coding rule for such a message wherein the distribution of symbols in the coded message looks like the cleartext distribution, but does in fact not represent the original distribution. One may for instance leave the letter 'x' as uncoded, creating a peak or a maximum in a distribution, while the letter 'e' may be coded as 10 or even more different symbols each having no peak or a maximum in a distribution.

In accordance with a further aspect of the present invention a system can implement a coding rule in different but defined ways. In one embodiment one can determine a coding rule based on a language, for instance for text coding. In that case a computer program may analyze a message of a certain length, and determines a symbol distribution. Based on the symbol distribution, a computer program of a system may find, for instance in a database a language that best matches the distribution. Associated with that language may be provided an m-to-n coding rule that can be applied. The coding rule will generate a coded message from a message that complies with the measured distribution by applying a corresponding pre-programmed coding rule. The coding rule may code a message to a coded message with a symbol distribution that is relatively uniform.

It is possible that a measured distribution of symbols in a message is an approximated by a stored distribution profile. For instance a computer program may compare measured and stored distributions and selects or assigns to the message a stored distribution that comes closest to the measured distribution. The selected coding rule is then based on the best approximation. The coded message may then have an approximation of a uniform distribution instead of a truly uniform distribution.

In many cases it may be beneficial to first scramble an m-state message with an m-state scrambler before applying the m-to-n coding rule. This may have (especially in shorter messages) an effect on the m-state symbol distribution. The assignment of a distribution and the selecting of a coding rule should preferably be performed after the scrambling, though it may also be done before scrambling.

In a further embodiment, one may assign a distribution to a message by for instance selecting a context from a menu. Such a menu may offer different languages and variations of a language. For instance one may select American English or British English.

One may assign a distribution in any context of a message comprised of m-state symbols. For instance a video message may be have generally bright intensity pixels or pre-dominantly low intensity pixels. Each type of distribution of pixels may correspond to a different type of coding.

One may have ranges of distributions of symbols, with each distribution assigned one or more coding rules. For instance, one may break up a message is several sub-messages. One may provide each distribution of symbols with different coding rules that may achieve coded messages with similar coded symbol distributions.

It should be apparent that the multi-valued coding methods herein provided are reversible and that each coding step can also be decoded. Accordingly as an aspect of the present invention a coding method as well as a coding system is provided. The coding system may be stand alone. It may also be part or embedded in a computer such as a personal computer, or a mobile phone or any other computing device that can perform the aspects of the present invention.

A decoding system enabled to decode the coded messages is also provided. In case a coding scheme is developed by a computer then the coding scheme should be made available to the decoding system. This information may be provided in a separate message to the decoding system. It may also be hidden in the coded message, where it can be retrieved by the decoding system. One may of course not hide the coding scheme in a message in such a way that it is coded according to the coding scheme and that no other retrieval is possible. Preferably a coding scheme is n-valued coded in a separate part of a message.

The coding and decoding method may be embodied in instructions that may be stored in and retrieved from a computer memory by a processor, the processor being able to execute the instructions as a computer program. The coding and decoding methods may be part of a word processing program. It may be embedded in a chip and be part of a storage device or a communication device or a computer device. In general one thinks of messages as in letters or numbers. However symbols may be represented by a signal or an occurrence of a physical phenomenon representing a state. A state has the property that it is different from another state.

The coding methods provided herein may be part or a step in other coding methods. The size of words of symbols may be increased by adding parity check symbols for instance for error detection or correction.

Methods and systems are provided herein that code a message of m-state symbols into a message of n-state symbols. One aspect of security is provided by the way of coding rather than using an agreed upon key, though one may involve a key to further increase security. It is possible and fully contemplated that methods and systems provided herein are part or a step in other aspects of coding. Sometimes an m-state message will be called cleartext as meaning herein yet being uncoded by a coding method that will create a further coded n-state message. It does not mean that the cleartext message is a message that is readable or playable by a user without further decoding, or demodulation. For instance, a video, audio or text message that has been processed for removing redundant or repetitive information such as commonly used in compression may also be considered a cleartext message in the context of different aspects of the present invention.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. An apparatus for coding p m-state symbols in a message with p>1, each m-state symbols able to assume one of m states with m>2 into p n-state symbols with n>m, comprising:
    a memory enabled to store data and instructions;
    a processor to perform steps comprising:
        implementing a first coding rule that codes a first m-state symbol in the message having a first of m states and a second m-state symbol in the message also having the first of m states into a first and a second n-state symbol with n>m the first and the second n-state symbols having different states; and
        coding the p m-state symbols in the message with at least the first coding rule into a coded message of p n-state symbols.

2. The apparatus as claimed in claim 1, further comprising instructions to perform the steps of:
    implementing a second coding rule that modifies the first coding rule in a reversible manner.

3. The apparatus as claimed in claim 1, wherein a statistical distribution of p n-state symbols in the coded message is different from a statistical distribution of p m-state symbols in the message.

4. The apparatus as claimed in claim 1, wherein a distribution of n-state symbols in the coded message is substantially uniform.

5. The apparatus as claimed in claim 1, wherein each n-state symbol in the coded message has a unique state.

6. The apparatus as claimed in claim 1, wherein a single n-state symbol is represented as a plurality of k-state symbols with k<n.

7. The apparatus as claimed in claim 1, wherein the message is scrambled before being coded.

8. The apparatus as claimed in claim 1, wherein the message is a video message.

9. The apparatus as claimed in claim 1, wherein the apparatus is part of a communication system.

10. The apparatus as claimed in claim 1, wherein the apparatus is part of a storage system.

11. An apparatus for decoding a coded message containing p n-state symbols with p>2 and n>2, comprising:
    a memory enabled to store data and instructions;
    a processor to perform steps comprising:
        implementing a first decoding rule that decodes a first n-state symbol in the coded message having a first of n states and a second n-state symbol in the message having a second of n states wherein the first and the second state are different states into a first and a second m-state symbol with m<n the first and the second m-state symbols having identical states; and
        decoding the p n-state symbols in the coded message with at least the first decoding rule into a decoded message of p m-state symbols.

12. The apparatus as claimed in claim 11, further comprising:
    implementing a second decoding rule that modifies the first decoding rule in a reversible manner.

13. The apparatus as claimed in claim 11, wherein a statistical distribution of p n-state symbols in the coded message is different from a statistical distribution of p m-state symbols in the decoded message.

14. The apparatus as claimed in claim 11, wherein a distribution of n-state symbols in the coded message is substantially uniform.

15. The apparatus as claimed in claim 11, wherein each n-state symbol in the coded message has a unique state.

16. The apparatus as claimed in claim 11, wherein a single n-state symbol is represented as a plurality of k-state symbols with k<n.

17. The apparatus as claimed in claim 11, wherein the coded message is descrambled before being decoded.

18. The apparatus as claimed in claim 11, wherein the coded message is a video message.

19. The apparatus as claimed in claim 11, wherein the apparatus is part of a communication system.

20. The apparatus as claimed in claim 11, wherein the apparatus is part of a storage system.

* * * * *